United States Patent [19]

Dirkin et al.

[11] Patent Number: 4,684,280
[45] Date of Patent: Aug. 4, 1987

[54] CLEVIS CONNECTION

[75] Inventors: William Dirkin; Gary Feldt, both of Kalamazoo, Mich.

[73] Assignee: Pneumo Abex Corporation, Boston, Mass.

[21] Appl. No.: 851,156

[22] Filed: Apr. 14, 1986

[51] Int. Cl.[4] ............................................. F16C 11/00
[52] U.S. Cl. ..................................... 403/157; 403/79; 403/153; 403/356; 403/161
[58] Field of Search ............... 403/157, 150, 153, 159, 403/156, 243, 248, 277, 280, 265, 366, 368, 119, 120, 154, 158, 161, 162, 79, 356

[56] References Cited

U.S. PATENT DOCUMENTS

| 188,805 | 3/1877 | Lewis . | |
|---|---|---|---|
| 270,935 | 1/1883 | Curtis | 403/366 X |
| 1,131,073 | 3/1915 | Mosher et al. . | |
| 1,138,298 | 5/1915 | Lang . | |
| 1,153,986 | 9/1915 | Whitney | 403/162 X |
| 1,287,143 | 12/1918 | Troxler | 403/79 X |
| 1,295,218 | 2/1919 | Shaffer | 403/79 X |
| 1,321,151 | 11/1919 | Rowley | 403/158 |
| 1,483,282 | 2/1924 | Coston | 403/150 X |
| 1,966,574 | 7/1934 | Wenneborg | 403/79 X |
| 2,276,753 | 3/1942 | Tinnerman | 403/356 |
| 2,621,950 | 10/1947 | Ricks . | |
| 2,937,040 | 5/1960 | Hutton . | |
| 3,072,448 | 1/1963 | Melton et al. . | |
| 3,710,674 | 1/1987 | Tabor | 403/162 X |
| 3,847,492 | 11/1974 | Kennicutt et al . | |
| 4,015,505 | 4/1977 | Murray . | |
| 4,034,946 | 7/1977 | Zimmer, Jr. . | |
| 4,285,305 | 8/1981 | Kaufman et al. | 403/356 X |
| 4,472,075 | 9/1984 | Forni | 403/157 |

FOREIGN PATENT DOCUMENTS

| 465297 | 2/1914 | France | 403/157 |
|---|---|---|---|
| 410673 | 8/1976 | U.S.S.R. | 403/157 |

Primary Examiner—Cornelius J. Husar
Assistant Examiner—Todd G. Williams
Attorney, Agent, or Firm—Renner, Otto, Boisselle & Lyon

[57] ABSTRACT

Clevis connection includes a clevis bushing having a bushing sleeve, with a shoulder at one end having a tapered inner diameter, and a longitudinally extending slot through the shoulder and a portion of the length of the bushing sleeve. The bushing is inserted through aligned holes in the clevis arms and connecting lug. Then a tapered expander collet is inserted into the tapered inner diameter of the bushing shoulder and a bolt is inserted through the collet and bushing so that the bolt head loads through the collect which expands the bushing to cause pre-stress on the surrounding lug and a pre-load clamping of the connecting lug to one of the clevis arms, and cause pre-stress on the other clevis arm.

20 Claims, 4 Drawing Figures

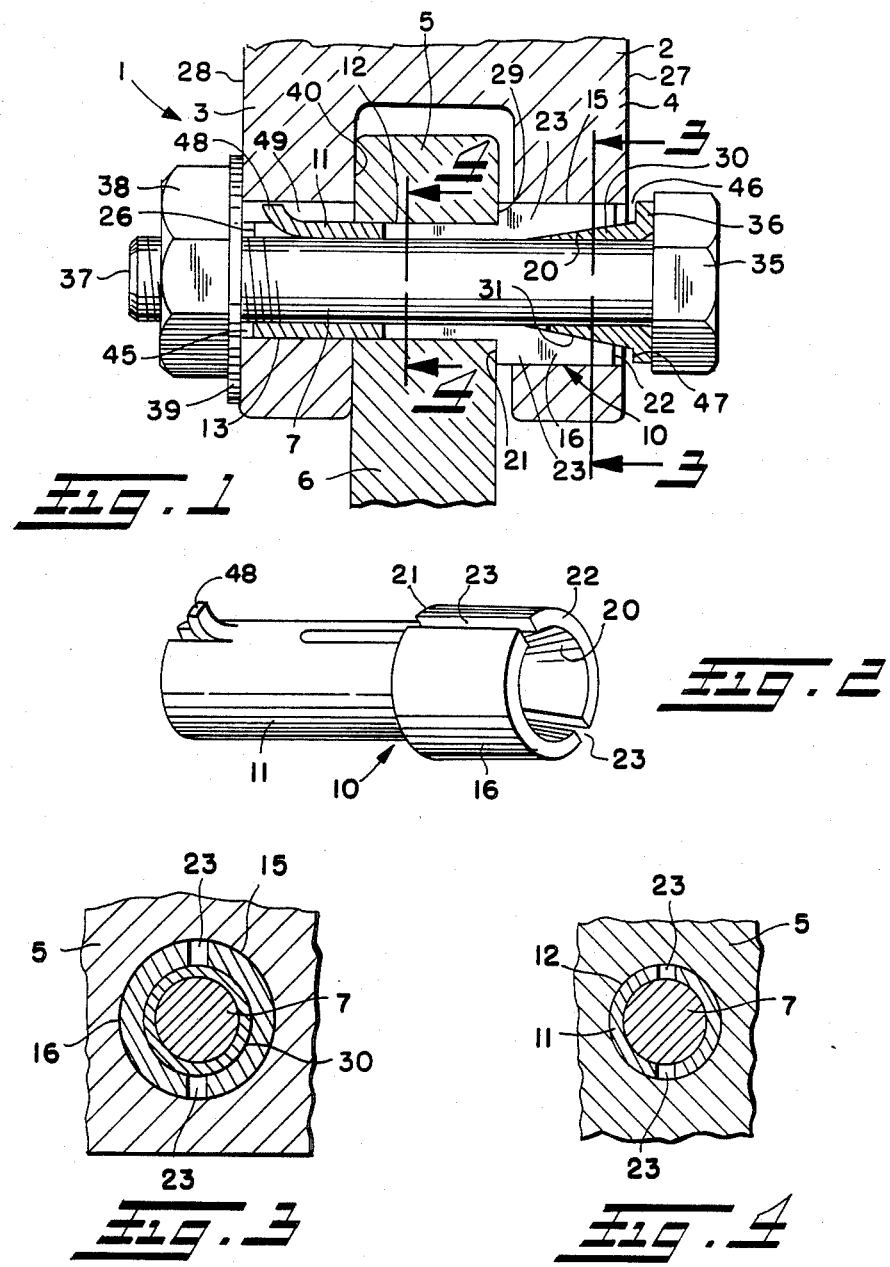

CLEVIS CONNECTION

BACKGROUND OF THE INVENTION

This invention relates generally, as indicated, to a clevis connection, including particularly an interface shoulder bushing for eliminating free play.

A typical clevis connection consists of a clevis member having a pair of spaced apart clevis ears or arms, with a pin extending between the arms for attachment of a connecting lug therebetween. In certain applications, it is desirable to eliminate free play between the pin and connecting lug as well as between the pin and clevis member without gouging the hole surfaces as oftentimes occurs with press fit designs. Also, in certain applications it is desirable that a pre-load not be produced across the clevis arms, since it could result in deleterious effects in a weight efficient joint due to possible stress corrosion.

SUMMARY OF THE INVENTION

With the foregoing in mind, it is a principal object of this invention to provide a novel clevis connection which eliminates free play between the clevis pin and surrounding lug and clevis member.

Another object is to provide such a clevis connection in which there is pre-load clamping of the connecting lug to the clevis member to cause a pre-stress which eliminates lateral play therebetween.

Still another object is to provide such a clevis connection which produces a pre-stress in the connecting lug surrounding the clevis pin.

Yet another object is to provide such a clevis connection in which a single overload will not cause a loss of pre-stress between the clevis pin and surrounding connecting lug.

A further object is to provide such a clevis connection which does not produce a pre-load across the clevis arms.

Yet another object is to provide such a clevis connection which achieves a double shear connection and an effective press fit.

A further object is to provide such a clevis connection in which the connection strength for loads aligned with the clevis pin is greatly enhanced due to the load shearing between the clevis arms.

Still another object is to provide such a clevis connection which will tolerate relatively loose diametral tolerances between the various mating parts.

Yet another object is to provide such a clevis connection with relatively inexpensive pre-stress optimization for fatigue.

In accordance with one aspect of the invention, the clevis connection includes a clevis bushing comprising a bushing sleeve having a shoulder at one end with a tapered inner diameter, and a longitudinally extending slot through the shoulder and a portion of the length of the bushing sleeve. The clevis bushing is inserted through aligned holes in the clevis arms and connecting lug. Then a tapered expander collet is inserted into the tapered inner diameter of the bushing shoulder, and a clevis pin (bolt) is inserted through the collet and bushing so that the bolt head loads through the collet, which expands the bushing. This causes a pre-stress on the surrounding connecting lug and pre-load clamping of the connecting lug to one of the clevis arms, thus eliminating lateral play, and allows for a pre-stress to be generated in the other clevis arm, to protect from free play and fatigue.

In accordance with another aspect of the invention, the clevis bushing may be provided with an index tab to prevent relative rotation between the clevis bushing and surrounding connecting lug.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section through a preferred form of clevis connection in accordance with the invention;

FIG. 2 is a perspective view of a clevis bushing which is incorporated in the clevis connection of FIG. 1; and FIGS. 3 and 4 are fragmentary transverse sections through the clevis connection of FIG. 1 taken substantially along the lines 3—3 and 4—4 thereof.

DETAILED DESCRIPTION OF THE PREFERRED EMBODIMENT

Referring now in detail to the drawings and initially to FIG. 1, there is shown a preferred form of clevis connection 1 in accordance with this invention including a clevis member 2 having a pair of axially spaced apart clevis ears or arms 3, 4 for receipt of the lug portion 5 of a connecting member 6 therebetween and attachment thereto as by means of a pin 7 extending through aligned holes in the members.

To eliminate lateral play between the clevis member 2 and connecting member 6 without having to provide extremely close tolerances between the various mating parts, and to prevent gouging of the hole surfaces as often occurs with press fit designs, a clevis bushing 10 in accordance with this invention is utilized. As clearly shown in FIGS. 1 and 2, the clevis bushing 10 includes a cylindrical sleeve portion 11 having an inner diameter (I.D.) slightly greater than the outer diameter (O.D.) of the clevis pin 7 to provide a close sliding fit therebetween. Also, the O.D. of the cylindrical sleeve portion 11 is slightly less than the I.D. of the respective holes 12 and 13 through the connecting lug portion 5 and one of the clevis arms 3 to provide a close sliding fit therebetween. The other connecting arm 4 has a somewhat larger diameter hole 15 therethrough for close sliding receipt of an enlarged external shoulder 16 on the associated end of the clevis bushing 10, for a purpose to be subsequently described.

As evident from FIGS. 1 and 2, the I.D. of the clevis bushing tapers outwardly at 20 for a substantial portion of the length of the shoulder 16, commencing, for example, a short distance axially outwardly from the inner end face 21 of the shoulder and extending all the way to the outer end face 22 of such shoulder. A longitudinal slot 23 extends diametrically through opposite sides of the bushing 10 the entire length of the shoulder 16 and a portion of the length of the bushing sleeve 11 a distance corresponding, for example, approximately to the axial thickness of the lug portion 5 of the connecting member 6 which is received between the two clevis arms 3, 4.

The shoulder 16 has an axial length which is desirably approximately equal to but may be somewhat less than the axial thickness of the associated clevis arm 4. Moreover, the axial length of the bushing sleeve 11 from the inner end face 21 of shoulder 16 to the opposite end 26 is somewhat less than the axial thickness of the connecting lug portion 5 and clevis arm 3, for a purpose to be subsequently described.

To make the connection, the lug portion 5 of the connecting member 6 is inserted between the clevis arms 3, 4 with its hole 12 in coaxial alignment with respective holes 13, 15 in the clevis arms. Then the clevis bushing 10 is inserted through the aligned holes 15, 12 and 13 from the outer end face 27 of the clevis arm 4 until the axial inner end face 21 of the shoulder 16 bears up against the adjacent side 29 of the connecting lug 5. Next an expander collet 30 having a tapered O.D. 31 matching that of the tapered I.D. 20 of the bushing 10 is inserted into the bushing from the outer end face 22, and the clevis pin 7 is inserted all the way through the collet and bushing from the outwardly facing side 27 and beyond the other side 28 of the clevis member 2.

The clevis pin 7 is preferably a bolt having a bolt head 35 on one end for engagement with a radial flange 36 on the outer end of the collet 30, and is threaded at its other end 37 for threaded engagement by a nut 38 exteriorly of the other clevis arm 3. A washer 39 may also be inserted on the bolt 7 between the nut 38 and outwardly facing side 28 of the clevis arm 3.

As will be apparent, upon tightening the nut 38, the bolt head 35 will force the collet 30 axially inwardly, causing axial inward movement of the bushing 10 to clamp the connecting lug 5 against the inwardly facing side 40 of the clevis arm 3 while at the same time causing radial outward expansion of the split length of the bushing to pre-load the surrounding lug portion 5 and surrounding wall 15 of the clevis arm 4. This results in a pre-load clamping of the thin lug portion 5 to the clevis member 2, thus eliminating lateral play therebetween in order to minimize fatigue damage. Since lug pre-stress is a function of the taper angle of the collet 30 and bolt torque, such a clevis connection provides a relatively inexpensive lug pre-stress optimization for fatigue. Also, the radial outward expansion of the bushing 10 causes a pre-stress in the other clevis arm 4 to protect same from free play and fatigue.

When the bolt 7 is torqued to the desired extent, there should still be a clearance gap or space 45 between the left end 26 of the bushing sleeve 11 and the adjacent surface of the nut 38 and washer 39 combination pressing up against the outwardly facing side 28 of the clevis arm 3 as well as a clearance space or gap 46 between the inner end face 47 of the collet flange 3 and bolt head 35 combination and the outwardly facing side 27 of clevis arm 4 as shown in FIG. 1. This is important to the clamping of the lug portion 5 against the clevis arm 3 and the elimination of lateral play between the clevis pin 7 and lug portion and clevis arm 4 in the manner previously described. Also, if at any time lug yield should occur from overload, any small expansions of the pre-stressed lug 5 will not result in substantial loss of pre-stress because of the continued axial force being applied against the collet 30 due to the tensile extension of the clevis pin (bolt) 7 which further expands the bushing, thus maintaining such pre-load.

Because of this tight pre-load fit of the bushing 10 with the surrounding lug 5 and clevis arm 4, any lateral bending of the clamped clevis arm 3 will also be shared by the pre-stressed clevis arm 4. If desired, the clevis bushing 10 may be indexed with respect to the clevis member 2 as by providing a radially outwardly extending tab 48 adjacent the left end of the bushing sleeve 11 for receipt in a longitudinal groove or keyway 49 in the wall of the bore 13 in clevis arm 3.

From the foregoing, it will not be apparent that the novel clevis connection of the present invention provides a relatively inexpensive lug pre-stress optimization for fatigue. Also, the connection strength for loads aligned with the clevis pin is greatly enhanced due to the load sharing between the clevis arms, and the design will tolerate relatively loose diametral tolerances between the various mating parts. In addition, the shouldered bushing achieves a design efficiency by providing a double shear connection and an effective press fit with the clevis member.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

We claim:

1. A clevis connection comprising a clevis member including first and second clevis arms, a connecting member having a connecting lug received between said clevis arms, a bolt extending through respective first and second openings in said first and second clevis arms and through a third opening in said connecting lug, a bushing surrounding said bolt, said bushing having a sleeve portion extending through said third opening in said connecting lug and into said first opening in said first clevis arm, said bushing having an enlarged shoulder extending into said second opening in said second clevis arm, said shoulder having an inner end face radially overlapping one side of said connecting lug, and means for urging said shoulder against said one side of said connecting lug to clamp said connecting lug against an interior surface of said first clevis arm.

2. The clevis connection of claim 1 further comprising an axial slot in said bushing extending the entire length of said shoulder and a portion of the length of said sleeve portion, said shoulder having a tapered opening therein, and collet means engageable with said tapered opening for expanding said sleeve portion into engagement with a surrounding wall of said third hole in said connecting lug to pre-stress said surrounding wall of said third hole in said connecting lug.

3. The clevis connection of claim 2 wherein said collet means also expands said shoulder into engagement with a wall of said second hole in said second clevis arm to cause a pre-stress on said wall of said second hole in said clevis member.

4. The clevis connection of claim 3 wherein said means for urging said shoulder against said connecting lug includes said bolt which is tensioned to apply an axial force urging said shoulder towards said connecting lug, said bolt having a threaded end extending axially outwardly beyond said first clevis arm and a bolt head at the other end of said bolt, and nut means threadedly engaging said threaded end for tensioning said bolt, said collet means extending between said bolt head and shoulder for transferring the tension load on said bolt to said shoulder to urge said shoulder against said connecting lug and expand said bushing including said shoulder radially outwardly to pre-load said connecting lug and clevis member.

5. A clevis connection comprising a clevis member including a pair of axially spaced clevis arms, a connecting member including a connecting lug received between said arms, a clevis pin extending through aligned openings in said clevis arms and connecting lug, means for pre-load clamping said connecting lug to an interior surface of one of said arms to eliminate lateral play, said means for pre-load clamping comprising a bushing surrounding said connecting pin, said bushing having a sleeve portion extending through a first opening in said connecting lug and into a second opening in said one clevis arm, said bushing having an enlarged shoulder extending into a third opening in the other of said clevis arms, said shoulder having an inner end face radially overlapping one side of said connecting lug, and means for urging said shoulder against said one side of said connecting lug to clamp said connecting lug against said interior surface of said one clevis arm, and means for causing a pre-stress on a wall of said first opening in said connecting lug.

6. The clevis connection of claim 5 wherein said means for urging said shoulder against said one side of said connecting lug includes said clevis pin which is tensioned to apply an axial force urging said shoulder against said connecting lug.

7. The clevis connection of claim 6 wherein said clevis pin comprises a bolt having a threaded end extending outwardly beyond said one clevis arm and a bolt head at the other end of said bolt, nut means threadedly engaging said threaded end for tensioning said bolt, and transfer means for transferring a tension load from said bolt to said bushing for urging said shoulder against said connecting lug.

8. The clevis connection of claim 7 wherein said sleeve portion of said bushing extends part way through said first opening in said one clevis arm.

9. The clevis connection of claim 7 wherein said transfer means comprises an insert between said shoulder and said bolt head.

10. The clevis connection of claim 9 wherein said shoulder extends part way through said third opening in said other clevis arm.

11. The clevis connection of claim 10 wherein said bolt head is located axially outwardly of said other clevis arm, and said insert extends into said third opening in said other clevis arm and into engagement with said shoulder.

12. The clevis connection of claim 5 further comprising means for causing a pre-stress on a wall of said third opening in said other clevis arm.

13. The clevis connection of claim 5 wherein said means for causing a pre-stress on said wall of said first opening in said connecting lug comprises said bushing, said bushing having a transverse slot therethrough extending axially from one end of said bushing received in said third opening in said other clevis arm and into said first opening in said connecting lug, and wedge means for expanding said bushing into engagement with said wall of said first opening in said connecting lug to pre-stress said wall of said first opening.

14. The clevis connection of claim 13 wherein said wedge means also expands said bushing into engagement with a wall of said third opening in said other clevis arm to cause a pre-stress on said wall of said third opening in said other clevis arm.

15. A clevis connection comprising a clevis member including a pair of axially spaced clevis arms, a connecting member including a connecting lug received between said arms, a clevis pin extending through aligned openings in said clevis arms and connecting lug, means for pre-load clamping said connecting lug to an interior surface of one of said arms to eliminate lateral play, and means for causing a pre-stress on a wall of a first opening in said connecting lug, said means for causing a pre-stress comprising a bushing surrounding said clevis pin, said bushing extending through said first opening in said connecting lug and into respective second and third openings in said clevis arms, said bushing having a transverse slot therethrough extending axially from one end of said bushing received in said third opening in the other of said clevis arms and into said first opening in said connecting lug, and wedge means for expanding said bushing into engagement with a surrounding wall of said first opening in said connecting lug to pre-stress said wall of said first opening in said connecting lug, said wedge means also expanding said bushing into engagement with a wall of said third opening in said other clevis arm to cause a pre-stress in said wall of said third opening in said other clevis arm, said means for pre-load clamping said connecting lug to said interior surface of said one clevis arm comprising an enlarged shoulder on said one end of said bushing which extends into said third opening in said other clevis arm, said shoulder having an inner end face radially overlapping one side of said connecting lug, and means for urging said shoulder against said connecting lug to clamp said connecting lug against said interior surface of said one clevis arm, said transverse slot extending axially inwardly beyond the length of said shoulder into said first opening in said connecting lug.

16. The clevis connection of claim 15 wherein said means for urging said shoulder against said connecting lug includes said clevis pin which is tensioned to apply an axial force urging said shoulder towards said connecting lug.

17. The clevis connection of claim 16 wherein said clevis pin comprises a bolt having a threaded end extending axially outwardly beyond said one clevis arm and a bolt head at the other end of said bolt, nut means threadedly engaging said threaded end for tensioning said bolt, and transfer means for transferring the tension load from said bolt to said shoulder.

18. The clevis connection of claim 17 wherein said transfer means comprises said wedge means, said shoulder having a tapered opening for wedging engagement by said wedge means.

19. The clevis connection of claim 18 further comprising indexing means for indexing said bushing with respect to said clevis member.

20. The clevis connection of claim 19 wherein said indexing means comprises a radially outwardly extending tab on said bushing extending into a keyway in said one clevis arm.

* * * * *